April 18, 1961 W. F. BAILEY ET AL 2,980,795

AUTODYNE CONVERTER

Filed Dec. 9, 1959 2 Sheets-Sheet 1

April 18, 1961 W. F. BAILEY ET AL 2,980,795

AUTODYNE CONVERTER

Filed Dec. 9, 1959 2 Sheets-Sheet 2

United States Patent Office 2,980,795

Patented Apr. 18, 1961

2,980,795

AUTODYNE CONVERTER

William F. Bailey, Valley Stream, Richard J. Farber, New Hyde Park, and Joseph J. Mazzochi, Huntington, N.Y., assignors to Hazeltine Research, Inc., a corporation of Illinois Filed Dec. 9, 1959, Ser. No. 858,435

7 Claims. (Cl. 250—20)

This invention pertains to frequency converters, and particularly to an autodyne frequency converter susceptible to automatic-gain-control of the amplitude of the converted output signal.

In the interest of economy, most present-day radio and television receivers employ a single circuit stage known as a "converter" which generates a local oscillatory signal and also mixes it with the received modulated radio frequency (RF) signal in order to shift the signal carrier frequency to a fixed intermediate frequency equal to the difference between the carrier and oscillatory frequencies. Such converter circuits commonly comprise a pentagrid vacuum tube wherein the cathode and the first two grids operate as a triode oscillator and the remaining three grids and anode operate as a pentode mixer. The received RF signal is applied to the first mixer grid, so that as the received and oscillatory signals drift in and out of phase at their difference frequency rate the current reaching the anode is caused to vary in amplitude at the same rate. The circuit is arranged so the anode current is non-sinusoidal, resulting in production of a signal component at the anode at the difference frequency. This component will also have the same modulation as the received signal so long as the amplitude of oscillation is large relative to the signal. Automatic-gain-control (AGC) of such a pentagrid converter is readily achieved by using a direct AGC voltage to provide a variable bias to the signal grid.

However, the performance of a frequency converter employing a pentagrid tube suffers from the fact that less than one-third of the cathode current actually reaches the anode and further because the interposition of two grids between the signal grid and cathode results in a relatively low value of transconductance between anode current and signal voltage. The efficiency of a converter is usually expressed in terms of its "conversion transconductance," which is the ratio of the converted or intermediate frequency component of the anode current to the signal voltage. It is relatively low for a pentagrid tube, due in part to the low anode current compared to the total cathode current. The current division among the many electrodes in this type of tube also leads to introduction of considerable noise into the converted signal.

Much higher values of conversion transconductance and less noise contribution are obtainable from an "autodyne" type of frequency converter wherein either a triode, tetrode or pentode may be employed. In such tubes a high proportion of the cathode current reaches the anode. In addition, the RF signal is applied to the grid closest to the cathode, so that a high transconductance is obtained. In conventional autodyne converters oscillation is established by providing a regenerative feedback loop including the anode and the signal grid, the feedback loop being tuned to a frequency equal to that of the received RF carrier plus the required converted or intermediate frequency (IF). The oscillatory current at the anode is caused to be non-sinusoidal, generally having a pulse waveform, by applying an appropriate bias to the signal grid or screen grid. As a result, the required converted IF signal is obtained across a circuit tuned to the IF connected to the anode.

A major drawback of such conventional autodyne converters is that they are not susceptible to automatic-gain-control. When it is attempted to use an AGC voltage to bias the signal grid, it is found that a decrease in the bias causes only a slight increase in the amplitude of the oscillatory current at the anode without effecting much increase in the amplitude of the converted output signal. Even more serious, when the AGC bias increases as a result of an increase in RF signal strength, the anode current may completely cut off. Oscillation and frequency conversion are thereby interrupted.

Accordingly, an object of the invention is to provide an autodyne frequency converter wherein the amplitude of the converted output signal may be stabilized by means of an applied automatic-gain-control voltage.

A further object is to provide an autodyne frequency converter wherein the amplitude of oscillation is relatively independent of the magnitude of an applied automatic-gain-control voltage.

A further object is to provide an autodyne frequency converter wherein interaction between the generated oscillatory signal and the RF input circuit is minimized.

Pursuant to the foregoing objects, an autodyne frequency converter constructed in accordance with the invention is adapted to convert a received radio frequency signal to a required frequency, the amplitude of the converted signal being stabilized against variations in received signal strength by means of a supplied automatic-gain-control voltage. Such a converter comprises a vacuum tube having a cathode, a signal grid, a screen grid, a suppressor grid and an anode. The converter further comprises input circuit means for applying the received signal between the cathode and the signal grid, and additional means for applying the automatic-gain-control voltage to the suppressor grid so as to cause increasing diversion of current from the anode to the screen grid as the received signal strength increases. Coupling circuit means are also provided for coupling at least the screen grid to the cathode to establish a regenerative feedback loop wherein oscillatory signals are produced at a frequency differing from that of the received signal by the required converted frequency. An output circuit connected across the anode and cathode obtains the frequency converted signal.

It should be noted that the term "electronic valve" as used in this specification and in the ensuing claims applies to either a vacuum tube, a semiconductor device, or any equivalent device for changing the form of or controlling or modifying an electrical signal or electrical energy supplied thereto. The present rapidly advancing state of the art pertaining to such devices fully justifies such terminology in view of their closely analogous applications and operating characteristics.

For a more complete description of the invention together with additional objects and features thereof, reference may be had to the following detailed specification and accompanying drawings, noting, however, that the actual scope of the invention is defined in the appended claims.

Referring to the drawings.

Figure 1:
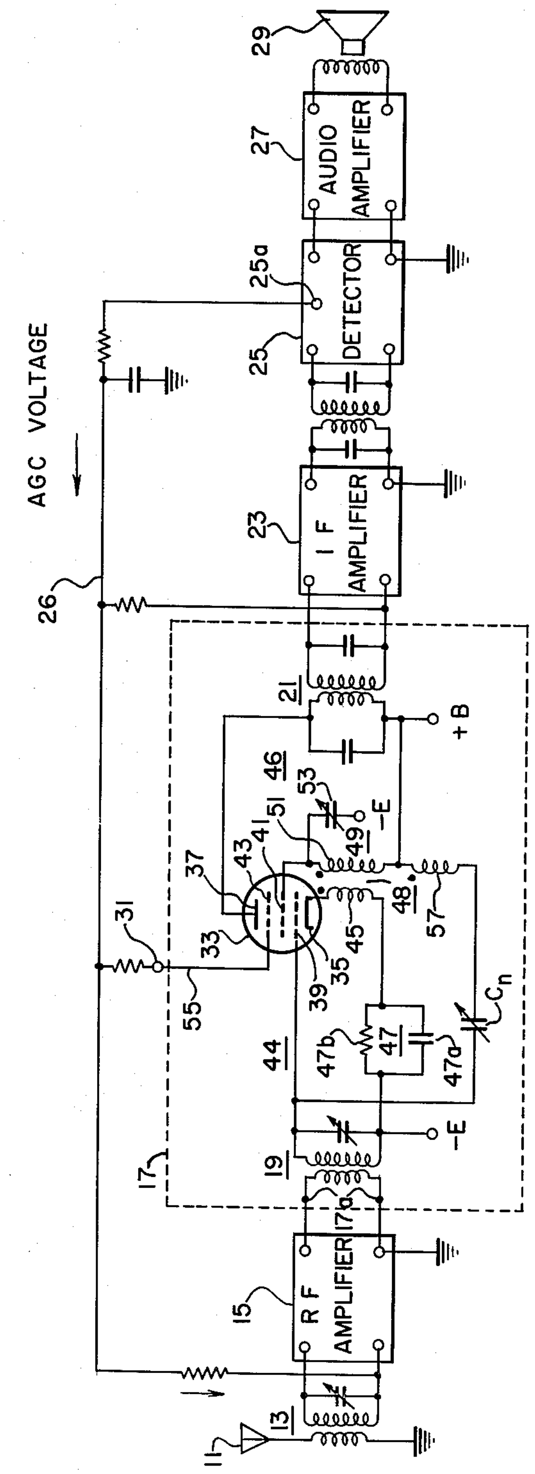
Fig. 1 is a circuit diagram of a signal-translating system incorporating an autodyne frequency converter constructed in accordance with the invention.

*Description of signal-translating system of Fig. 1*

The signal-translating system of Fig. 1 includes an antenna 11 for receiving a radio frequency (RF) signal consisting of a high-frequency carrier wave modulated at a lower frequency in accordance with the intelligence being transmitted. That is, it may be either a radio or a television signal, the system of Fig. 1 being shown as a radio receiver in the interest of avoiding unnecessary complication. The received signal is conveyed by tuned circuit 13 to RF amplifier 15 where it is amplified and then applied to frequency converter 17 by way of tuned RF transformer 19 comprised therein. Converter 17 serves the dual function of generating an oscillatory signal at a frequency differing from that of the received signal by an amount equal to a required intermediate frequency and of mixing the two signals so as to obtain an output signal at the required intermediate frequency (IF). The converted IF output signal is supplied by converter 17 by way of the fixed tuned IF transformer 21 to an IF amplifier 23. The modulation component of the converted IF signal will be the same as that of the received RF signal, so that converter 17 effectively functions to convert the received signal frequency to the required value. IF amplifier 23 may actually include one or more cascaded individual stages which together provide the required sensitivity and selectivity of the receiver, the resultant amplified IF signal being supplied via another tuned IF transformer to a detector 25. In the latter circuit the modulation component of the signal is separated from the IF carrier and is supplied to audio amplifier 27 which drives a loudspeaker 29. Of course, in the case of a television receiver, the modulation component would be applied to a video amplifier in lieu of audio amplifier 27. Detector 25 also utilizes the carrier component of the IF signal to produce at its additional output terminal **25*a* a negative direct voltage relative to ground proportional to the carrier amplitude. This AGC voltage is then supplied back via conductor 26 to one or more of the preceding stages of the receiver to control the signal gains thereof so as to stabilize the amplitude of the detected modulation component of the received signal against variations in signal strength. In Fig. 1 the automatic-gain-control (AGC) voltage is shown supplied back to bias RF amplifier 15 and IF amplifier 23 and also to provide bias at AGC input terminal 31 of converter 17**. Automatic-gain-control of all these stages is typical of present-day receivers.

*Autodyne converter of Fig. 1*

Considering now in more detail the novel autodyne converter 17 in the circuit of Fig. 1, as already indicated it is adapted to convert the frequency of the received RF signal applied across its input terminals **17*a* to a required or intermediate frequency, the amplitude of the converted signal being stabilized against variations in received signal strength by means of the supplied AGC voltage. The converter circuit comprises an electronic valve 33 having a current supply electrode 35, an output electrode 37, and three intermediate control electrodes 39, 41 and 43 successively spaced from supply electrode 35 for modifying the current at output electrode 37. Electronic valve 33 may actually be a vacuum tube or a semi-conductor device or any equivalent device, as described above. In the interest of definiteness, however, it has been illustrated as a vacuum tube pentode wherein current supply electrode 35 is the cathode, output electrode 37 is the anode, control electrode 39 nearest the cathode is the signal grid, control electrode 41 spaced therefrom is the screen grid, and control electrode 43** nearest the output electrode or anode is the suppressor grid.

Converter 17 further comprises input circuit means 44 for applying the signal received at converter input terminals **17*a* between the supply electrode or cathode 35 and the first control electrode or signal grid 39 of valve 33. An output circuit 46 is connected across the supply electrode or cathode 35 and the output electrode or anode 37 of valve 33 for obtaining the required frequency converted signal. Input circuit means 44 includes the tuned RF transformer 19 the secondary winding of which is connected between signal grid 39 and a source —E of a small negative direct bias voltage with respect to the common ground potential level of the complete receiver system. It additionally may include means such as an inductive winding 45 and a self-biasing circuit 47 connected in series between cathode 35 and source —E. The output circuit 46 of converter 17 comprises the tuned IF transformer 21 connected between output electrode or anode 37 of valve 33 and a source +B of positive direct operating potential with respect to ground. As previously indicated, transformer 21** is tuned to the required converted or intermediate frequency.

Converter 17 further comprises coupling circuit means 48 for coupling at least the second control electrode or screen grid 41 to supply electrode or cathode 35 to establish a regenerative feedback loop wherein oscillatory signals are produced at a frequency differing from that of the received RF input signal by the required converted frequency. Coupling circuit means 48 may be resonant at the foregoing oscillatory frequency, this being accomplished in Fig. 1 by means of tuned circuit 49 included therein. More specifically, tuned circuit 49 may include an inductive winding 51 and a capacitor 53, the winding being connected between screen grid 41 and positive supply voltage source +B and capacitor 53 being connected between that grid and ground by way of D.C. source —E. Coupling to cathode 35 is provided by the mutual inductance between winding 51 of tuned IF circuit 49 and winding 45, the latter also serving as part of the circuit means 48. The relative winding polarities may be as indicated by the dots adjacent thereto. In this way a complete regenerative feedback loop at the frequency to which circuit 49 is tuned is established including screen grid 41, tuned circuit 49, cathode 35 and signal grid 39, an oscillatory signal at the cathode relative to the signal grid being amplified at the screen grid relative to the cathode. Since a portion of the current supplied by cathode 35 to output electrode or anode 37 is actually diverted to screen grid 41, it is evident that the described feedback loop closely resembles a conventional triode oscillator wherein screen grid 41 effectively serves as the anode. The proportion of the total electron current which is diverted away from anode 37 to screen grid 41 may be controlled by means of the potential applied to the third control electrode or suppressor grid 43. This is utilized in the converter circuit of Fig. 1 by providing means such as the conductor 55 for connecting AGC input terminal 31 to suppressor grid 43 so as to apply the AGC voltage thereto. As a result, there will be an increasing diversion of current from output electrode or anode 37 to suppressor grid 33 as the received RF signal strength increases.

Coupling circuit means 48 is constructed so as to minimize interaction of the generated oscillatory signals and the received RF signal in input circuit 44. Of course, this is primarily avoided by the fact that the impedance of the RF tuned transformer winding across which the latter signal is applied is very low at the oscillating frequency. However, such interaction could still occur by way of the interelectrode capacitances within valve 33, particularly between screen grid 41 and signal grid 39. One manner of construction of coupling circuit means 48 to reduce this effect, as shown in Fig. 1, is to provide a neutralizing connection for applying to signal grid 39 a portion of the oscillatory signal of the screen grid which is equal and opposite to the oscillatory signal reaching it via the interelectrode capacitance of the signal grid and screen grid. Substantial neutralization is thus achieved. As will be described hereinafter, this problem is greatly minimized in another manner in the other illustrated embodiments of the invention. However, in Fig. 1 the described neutralizing circuit is important to proper operation. It may more specifically comprise a winding 57 and a capacitor $C_n$ connected in series between source +B and winding 51 of tuned circuit 49, winding 57 being inductively coupled to winding 51. The proper polarity of winding 57 relative to winding 51 has been indicated, in accordance with convention, by the dots adjacent thereto.

*Operation of autodyne converter in Fig. 1*

The operation of autodyne converter 17 in Fig. 1 may be understood by assuming that a small signal voltage initially occurs between the first control electrode or signal grid 39 and current supply electrode or cathode 35 and that, for example, it is momentarily positive at the signal grid. A larger proportion of the electron current supplied by cathode 35 thereby flows past the signal grid, increasing the current at screen grid 41 and so also the current through winding 51. A voltage is therefore induced in winding 45 connected to cathode 35 which drives the cathode potential down still more with respect to signal grid 39. It is thus apparent that a regenerative feedback loop exists between screen grid 41 and the cathode 35. Since winding 51 is part of tuned circuit 49, oscillation will be sustained at its resonant frequency. In addition, however, via the inter-electrode capacitance between signal grid 39 and screen grid 41 a path exists by which a portion of the oscillatory signal at screen grid 41 can reach input circuit 44 and interact with the RF signal therein. However, the neutralizing circuit comprising capacitor $C_n$ and winding 57 may be adjusted to apply an equal and opposite portion of the oscillatory signal to the signal grid so as to effectively neutralize the foregoing undesired coupling.

As oscillation builds up in amplitude in the foregoing feedback loop an increasing oscillatory current will flow from screen grid 41 to cathode 35 and through winding 45, returning to ground via self-biasing circuit 47 and source −E. However, when the amplitude reaches a level at which the cathode begins to be driven negative with respect to signal grid 39 during alternate half cycles, rectified grid current will flow between the signal grid and cathode which develops a bias potential across capacitor **47*a* and shunting resistor 47*b* comprised in self-biasing circuit 47. The bias potential so developed then prevents further increase in the amplitude of the oscillatory signal by interrupting the flow of current past signal grid 39. This will occur during at least a portion of alternate half-cycles of oscillation, thereby preventing current flow to output electrode or anode 37. The current at the anode thus occurs as a pulse in each oscillatory cycle. The cut-off interval will be governed by the discharge time constant established by the sizes of capacitor 47*a* and resistor 47*b*, and will usually exceed a half cycle. The amplitude of these current pulses at anode 37 will increase as the received RF signal at the signal grid and the generated oscillatory signal at the cathode drift into phase and will decrease as they drift out of phase, thus providing an anode current component at the difference frequency corresponding to the desired IF. In addition, if the amplitude of oscillation remains substantially constant and exceeds the amplitude of the received RF signal, this IF component will have the same modulation as the received RF signal. It therefore constitutes the required converted IF signal, and is isolated from the other frequency components of the pulsating anode current by means of tuned IF transformer 21 connected across the anode and the cathode or supply electrode 35. This signal is then supplied to the following IF amplifier 23** as previously described.

The explanation of the operation of autodyne converter 17 as given up to this point has tacitly assumed that the amplitude of the carrier component of the received RF signal at converter input terminals **17*a* remains substantially constant. In that case the AGC voltage applied to suppressor grid 43 will remain at a constant negative D.C. value. However, as the received signal strength falls the AGC voltage will rise toward ground potential. The screening effect of suppressor grid 43 on anode 37 is thus progressively reduced and the diversion of current from anode 37 to screen grid 41 is reduced. This reduces the transconductance between signal grid 39 and screen grid 41, and in prior autodyne converters would often reach a point at which insufficient gain existed in the feedback loop comprising the screen grid, cathode and signal grid to sustain oscillation. In the circuit of Fig. 1 this is prevented by setting the minimum or least negative level of the AGC voltage so that even when the received signal strength is at a minimum the bias between the suppressor grid and anode remains adequate to maintain oscillation in the above-described feedback loop. The minimum AGC voltage level may, of course, be set in conventional manner at detector 25. In order to prevent the reduction in signal gain which this would lead to if the cathode were returned to ground, as is conventional, the cathode is instead returned to the small negative D.C. potential −E which may be substantially equal to the minimum level of the AGC voltage. In addition, to maintain good signal coupling between the cathode and screen grid 41, the screen grid is also returned to the source of the −E bias potential instead of to ground. The operation of the feedback loop is thus the same as if potential −E were at ground, but sufficient oscillatory signal gain is assured to maintain oscillation for even the weakest received signal. If, on the other hand, the received signal should increase, the higher negative AGC bias voltage at suppressor grid 43 will divert an increasing proportion of the current at anode 37 to screen grid 41. This will strengthen the oscillation in the feedback loop from that electrode to cathode 35. However, the amplitude of oscillation will remain substantially constant at all signal levels due to the peak limiting action of biasing circuit 47** as described above.

The foregoing description brings out a unique advantage of the autodyne converter circuit of Fig. 1. This is that the AGC bias voltage applied to the third control electrode or suppressor grid 43 succeeds in controlling the diversion of current from output electrode or anode 37 to the second control electrode or screen grid 41, thus controlling the conversion transconductance of the converter in accordance with signal strength, without materially affecting either the frequency or the amplitude of the generated oscillatory signal by which the converted output signal is obtained. The only problem involved in utilization of this circuit is that rather careful adjustment of the described neutralization is required. However, this is greatly alleviated in the embodiment of the invention shown in Fig. 2.

Figure 2:
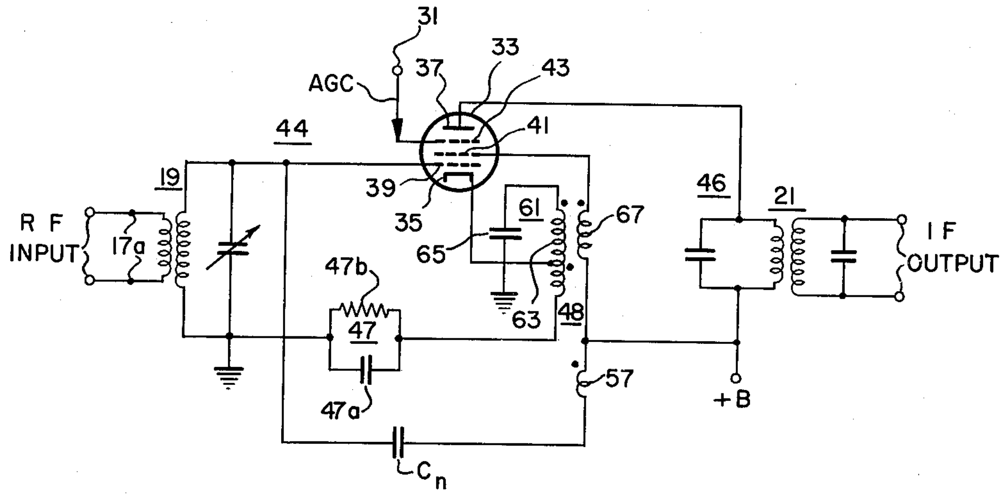
Fig. 2 is a circuit diagram of another embodiment of an autodyne frequency converter constructed in accordance with the invention.

*Autodyne frequency converter of Fig. 2*

The autodyne frequency converter circuit in Fig. 2 is generally similar to converter 17 in Fig. 1, corresponding elements being similarly identified. However, in Fig. 2 the coupling means 48 by which the second control electrode or screen grid 41 is coupled to supply electrode or cathode 35 to establish the regenerative feedback loop is constructed differently. In Fig. 2 it comprises a tuned circuit 61 connected to the cathode instead of to the screen grid. Tuned circuit 61 may have the same resonant frequency as tuned circuit 49 in Fig. 1, differing from the received signal frequency by the required converted or intermediate frequency. It may include a winding 63 connected between the grounded tuning capacitor 65 and biasing circuit 47, a tap on winding 63 being connected to cathode 35. Biasing circuit 47 and the terminal of the tuned secondary winding of RF input transformer 19 connected thereto are connected to ground, thus returning cathode 35 and the first control electrode or signal grid 39 to D.C. ground rather than to the negative potential −E as in the circuit of Fig. 1. This difference is due to the fact that in Fig. 2 the AGC voltage applied to suppressor grid 43 may be permitted to drop to zero or ground potential during weak signal reception without danger of interrupting oscillation. The coupling means 48 by which the above-mentioned feedback loop is established also includes inductive means such as the winding 67 connected between the second control electrode or screen grid 41 and D.C. supply source +B, winding 67 being inductively coupled to winding 63 of tuned circuit 61. The latter circuit thus inductively couples cathode 35 at least to screen grid 41. The relative polarities of windings 63 and 67 are as indicated by the dots adjacent thereto. The tap position on winding 63 may be set to achieve maximum amplitude of the oscillatory signals which are generated by virtue of the feedback from screen grid 41 to cathode 35 via winding 67 and tuned circuit 61.

While the converter of Fig. 2 operates in substantially the same manner as converter 17 in Fig. 1, an important difference results from the fact that in Fig. 2 the oscillatory signal impedance between screen grid 41 and ground is here only the relatively low impedance of winding 67 rather than the much higher impedance of a tuned circuit. As a result, the degree of undesired coupling of the oscillatory signals to input circuit 44 by way of the inter-electrode capacitance between screen grid 41 and signal grid 39 is greatly reduced. Neutralization may therefore either be dispensed with altogether or, if employed, becomes much smaller and less critcial in adjustment. Neutralizing winding 57 in Fig. 2 may actually consist of only a few extra turns of winding 67, and neutralizing capacitor $C_n$ may have a fixed value over the entire broadcast frequency band.

A further consequence of the reduction in undesired coupling is that a higher amplitude of oscillation is permissible in Fig. 2, enabling a lower operating bias to be employed. This is effected by reducing resistor **47*b* and/or capacitor 47*a*. Oscillation will thus continue even though the AGC voltage at suppressor grid 43** is allowed to drop substantially to ground potential during weak signal reception. In practice, it has also been found that the converter circuit of Fig. 2 is more readily adapted to standard alignment procedure for mass production than is the converter circuit of Fig. 1.

Figure 3:
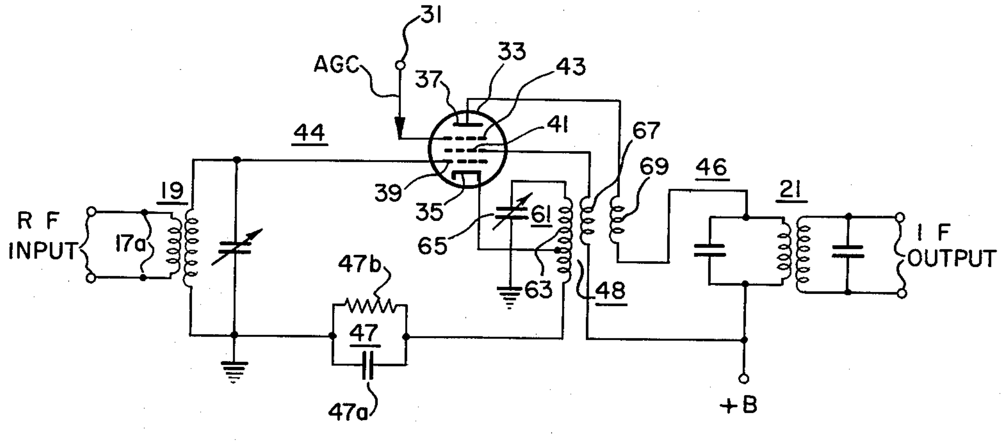
Fig. 3 is a circuit diagram of an improved embodiment of an autodyne frequency converter constructed in accordance with the invention.

*Autodyne frequency converter of Fig. 3*

The novel autodyne converter circuit of Fig. 3 is a still further improved embodiment of the invention substantially similar to that of Fig. 2. However, here coupling circuit means 48 not only couples the second control electrode or screen grid 41 to supply electrode or cathode 35 but it also establishes inductive coupling between the output electrode or anode 37 and the cathode. To this end, it may comprise means such as the winding 69 connected in series with anode 37 in output circuit 46 and inductively coupled to tuned circuit 61 so as to feed back thereto the oscillatory frequency component of the anode current pulses. In addition, no neutralization is needed in Fig. 3 inasmuch as undesired coupling to input circuit 44 due to the presence of inter-electrode capacitances in valve or vacuum tube 33 is here substantially eliminated. This is due to the fact that the supplementary anode feedback provided by winding 69 permits a reduction in the screen grid 41 feedback provided by winding 67. The impedance of the latter winding may therefore be made so small that inter-electrode capacitive coupling from the screen grid to the signal grid becomes negligible. The supplementary feedback provided by winding 69 also means that when the AGC bias voltage at the third control electrode or suppressor grid 43 drops, as it does when the received signal strength decreases the increased current at anode 37 will tend to increase the oscillatory signal fed back to cathode 35 so as to compensate for the decrease in the feedback from screen grid 43 by virtue of the decreased current thereat. Conversely, when the AGC voltage increases due to increasing received signal strength, the increased diversion of current from anode 37 to screen grid 41 will increase the oscillatory signal feedback effected by screen grid winding 67 so as to compensate for the reduced feedback effected by anode winding 69. The result is that the amplitude of the oscillatory signal fed back to the cathode via tuned circuit 61 to coupling circuit means 48 is rendered substantially independent of the AGC bias voltage.

An aspect of the circuit of Fig. 3 which should be noted is that the inter-electrode capacitance between the signal grid and a screen grid actually serves a beneficial purpose since it reduces the effective RF impedance of input circuit 44 at higher frequencies. This keeps up the conversion transconductance of the converter. In contrast, the conversion transconductance of a conventional pentagrid converter falls off at the higher frequencies.

An autodyne frequency converter constructed in accordance with the circuit of Fig. 3 was found to provide a conversion transconductance about 35% (2.5 db) better than that of a conventional pentagrid converter. This was with a 6DB6 pentode having a signal grid-to-anode transconductance of 4,000 micromhos and an anode resistance of about 60 kilohms. Actually, a 100% improvement (6 db) may easily be obtained by using a pentode with higher transconductance and anode resistance, of which many types are available. The significant circuit values of the converter circuit actually constructed were as follows:

| | |
|---|---|
| Capacitor **47*a*** | 0.01 microfarad. |
| Resistor **47*b*** | 1.8 kilohms. |
| Windings: | |
| **63** | 98 turns tapped with 18 turns between cathode **35** and bias circuit **47**. |
| **67** | 35 turns. |
| **69** | 25 turns. |

The above windings were constructed of size 3/41 Litz wire wound on a ¼" outside diameter coil form and were slug tuned.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An autodyne frequency converter for converting a received radio frequency signal to a required frequency, the amplitude of the converted signal being stabilized against variations in received signal strength by a supplied automatic-gain-control voltage, said converter comprising: a vacuum tube having a cathode, a signal grid, a screen grid, a suppressor grid and an anode; input circuit means for applying said received signal between said signal grid and said cathode; means for applying said automatic-gain-control voltage to said suppressor grid so as to cause increasing diversion of current from said anode to said screen grid as said received signal increases; coupling circuit means for inductively coupling at least said screen grid to said cathode to establish a regenerative feedback loop, a tuned circuit comprised in said coupling circuit means resonant at a frequency differing from that of said received signal by said required frequency so as to cause oscillatory signals to be produced in said feedback loop at said resonant frequency; said coupling circuit means being constructed so as to minimize interaction of said oscillatory and received signals in said input circuit due to the inter-electrode capacitance between said signal grid and said screen grid; and an output circuit connected across said anode and cathode resonant at said required frequency so as to obtain said frequency converted signal.

2. An autodyne frequency converter for converting a received radio frequency signal to a required frequency, the amplitude of the converted signal being stabilized against variations in received signal strength by a supplied automatic-gain-control voltage, said converter comprising: a vacuum tube having a cathode, a signal grid, a screen grid, a suppressor grid and an anode; input circuit means for applying said received signal between said signal grid and said cathode; means for applying said automatic-gain-control voltage to said suppressor grid so as to cause increasing diversion of current from said anode to said screen grid as said received signal strength increases; a tuned circuit connected to said screen grid resonant at a frequency differing from said received signal by said required converted frequency; means for inductively coupling said tuned circuit at least to said cathode to establish a regenerative feedback loop including said screen grid, said cathode and said signal grid and wherein oscillatory signals are produced at said resonant frequency; and an output circuit connected across said anode and cathode resonant at said required converted frequency so as to obtain said frequency converted signal.

3. An autodyne frequency converter for converting a received radio frequency signal to a required frequency, the amplitude of the converted signal being stabilized against variations in received signal strength by a supplied automatic-gain-control voltage, said converter comprising: a vacuum tube having a cathode, a signal grid, a screen grid, a suppressor grid and an anode; input circuit means for applying said received signal between said signal grid and said cathode; means for applying said automatic-gain-control voltage to said suppressor grid so as to cause increasing diversion of current from said anode to said screen grid as said received signal strength increases; a tuned circuit connected to said screen grid resonant at a frequency differing from said received signal by said required converted frequency; means for inductively coupling said tuned circuit at least to said cathode to establish a regenerative feedback loop including said screen grid, said cathode and said signal grid wherein oscillatory signals are produced at said resonant frequency; neutralizing circuit means coupled to said tuned circuit for applying a portion of said oscillatory signals to said signal grid in opposition to the oscillatory signals coupled thereto via the inter-electrode capacitance between said screen grid and said signal grid; and an output circuit connected across said anode and cathode resonant at said required converted frequency so as to obtain said frequency converted signal.

4. An autodyne frequency converter for converting a received radio frequency signal to a required frequency, the amplitude of the converted signal being stabilized against variations in received signal strength by a supplied automatic-gain-control voltage, said converter comprising: a vacuum tube having a cathode, a signal grid, a screen grid, a suppressor grid and an anode; input circuit means for applying said received signal between said signal grid and said cathode; means for applying said automatic-gain-control voltage to said suppressor grid so as to cause increasing diversion of current from said anode to said screen grid as said received signal strength increases; a tuned circuit connected to said cathode resonant at a frequency differing from that of said received signal by said required converted frequency; means for inductively coupling said screen grid to said tuned circuit to establish a regenerative feedback loop including said screen grid, said cathode and said signal grid wherein oscillatory signals are produced at said resonant frequency, the impedance of said inductive coupling means to said oscillatory signals being relatively low so as to minimize the oscillatory signals coupled to said signal grid via its inter-electrode capacitance to said screen grid; and an output circuit connected across said anode and cathode resonant at said required converted frequency so as to obtain said frequency converted signal.

5. An autodyne frequency converter for converting a received radio frequency signal to a required frequency, the amplitude of the converted signal being stabilized against variations in received signal strength by a supplied automatic-gain-control voltage, said converter comprising: an electronic valve having a current supply electrode, an output electrode, and three intermediate control electrodes successively spaced from said supply electrode for modifying the current at said output electrode; input circuit means for applying said received signal between said supply electrode and the first of said control electrodes; means for applying said automatic-gain-control voltage to the third of said control electrodes so as to cause increasing diversion of current from said output electrode to the second of said control electrodes as said received signal strength increases; coupling circuit means including means for inductively coupling said second control electrode to said supply electrode to establish a regenerative feedback loop including those electrodes and said first control electrode wherein oscillatory signals are produced at a frequency differing from that of said received signal by said required converted frequency; said coupling circuit means further including means for inductively coupling oscillatory signals appearing at said output electrode to said feedback loop to augment the oscillatory signals coupled thereto from said second control electrode, thus rendering the oscillatory signals in said feedback loop substantially independent of said automatic-gain-control voltage; and an output circuit connected across said supply and output electrodes resonant at said required converted frequency so as to obtain said frequency converted signal.

6. An autodyne frequency converter for converting a received radio frequency signal to a required frequency, the amplitude of the converted signal being stabilized against variations in received signal strength by a supplied automatic-gain-control voltage, said converter comprising: a vacuum tube having a cathode, a signal grid, a screen grid, a suppressor grid and an anode; input circuit means for applying said received signal between said signal grid and said cathode; means for applying said automatic-gain-control voltage to said suppressor grid so as to cause increasing diversion of current from said anode to said screen grid as said received signal strength increases; a tuned circuit for inductively coupling said screen grid to said cathode to establish a regenerative feedback loop including said screen grid, said cathode and said signal grid, said tuned circuit being resonant at a frequency differing from that of said received signal by said required converted frequency so as to cause oscillatory signals to be produced in said feedback loop at said resonant frequency; means connected to said anode for inductively coupling it to said tuned circuit so as to augment the oscillatory signals in said feedback loop with oscillatory signals appearing at said anode, thus rendering the oscillatory signals in said feedback loop substantially independent of said automatic-gain-control voltage; and an output circuit connected across said anode and cathode resonant at said required converted frequency so as to obtain said frequency converted signal.

7. An autodyne frequency converter for converting a received radio frequency signal to a required frequency, the amplitude of the converted signal being stabilized against variations in received signal strength by a supplied automatic-gain-control voltage, said converter comprising: a vacuum tube having a cathode, a signal grid, a screen grid, a suppressor grid and an anode; input circuit means for applying said received signal between said signal grid and said cathode; means for applying said automatic-gain-control voltage to said suppressor grid so as to cause increasing diversion of current from said anode to said screen grid as said received signal strength increases; a tuned circuit connected to said cathode resonant at a frequency differing from that of said received signal by said required converted frequency; first inductive means connected to said screen grid and inductively coupled to said tuned circuit for establishing a regenerative feedback loop including said screen grid, said cathode and said signal grid wherein oscillatory signals are produced at said resonant frequency, the impedance of said first inductive means being relatively low at said resonant frequency so as to minimize interaction of said received and oscillatory signals in said input circuit via the inter-electrode capacitance between said screen grid and said signal grid; second inductive means connected to said anode and inductively coupled to said tuned circuit for augmenting the oscillatory signals in said feedback loop with oscillatory signals appearing at said anode, thus rendering the oscillatory signals in said feedback loop substantially independent of said automatic-gain-control voltage; and an output circuit connected across said anode and cathode resonant at said required converted frequency so as to obtain said frequency converted signal.

References Cited in the file of this patent

UNITED STATES PATENTS 2,712,597 Dammers ---------------- July 5, 1955